Aug. 29, 1950  J. L. BUEHL  2,520,233
DECOY ANCHOR
Filed Nov. 17, 1945

Witness:
V. Siljander

Inventor
John L. Buehl
By: Shee Shee
Attys.

Patented Aug. 29, 1950

2,520,233

UNITED STATES PATENT OFFICE 2,520,233

DECOY ANCHOR

John L. Buehl, Washington, Ill.

Application November 17, 1945, Serial No. 629,216

1 Claim. (Cl. 43—3)

This invention relates to a decoy anchor and the principal object thereof is to provide means for directly attaching the anchor to the decoy after it has been used.

It is well known that after usage the ordinary anchors for decoys are thrown into the boat or are misplaced so that when they are again needed for use, much time is lost in locating the anchors and frequently they cannot be found.

In accordance with the present invention, the anchor is provided with a bail which may be passed around the neck of the decoy and latched thereto, whereby it is always fastened thereto when not in use and will always be found with the decoy.

With these and other objects and advantages in view, this invention consists in the several novel features hereinafter fully set forth and more particularly defined in the appended claim.

The invention is clearly illustrated in the drawing accompanying this specification, in which.

Figure 1:
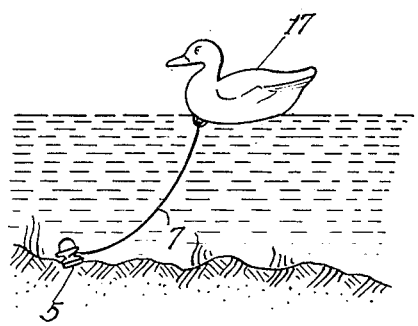
Fig. 1 is a view of decoy floating on a body of water and connected to a decoy anchor embodying a simple form of the present invention.

Referring to said drawing which is merely illustrative of one embodiment of the invention, the reference character 5 designates a weighted body, here shown in the form of a metal flat reel, having U-shaped notches 6 extending inward from its two ends. A line 7 is attached at one end to the reel as by passing one end thereof through a hole 8 in the reel and tying a knot about the line with said free end. When not in use, the line is wound upon the reel and its free end tied to the hereinafter mentioned bail.

One of the horns 9 of the reel is preferably made narrower at its end than the other horns, and extending through said horn is a hole 10 through which is passed an eye or loop 11, formed on one end of a curved resilient wire bail 12. The hole and eye or loop form a pivot connection between the bail and reel.

In the opposite horn 13, on the edge of the reel to which the bail is connected, is formed a socket 14 and projecting from said socket toward the end of the horn is a hole 15 of approximately the same diameter as that of the bail. The free end 16 of the bail is bent at an angle thereto so as to extend in a direction towards the end of the horn 13 when the bent end of the bail is attached thereto. To attach this end of the bail to the reel, the bent end 16 is inserted into the socket 14, bringing the extreme end of the bail's bent end portion into register with the hole 15 and it is then released; the inherent spring tension of the bail acting to thrust the bent end into the hole 15, thereby latching the bail to the reel. To release the bail, the bent end thereof is pressed back towards the pivoted end, thereby drawing the bent end from the hole 15 and then drawing the bent end out of the socket 14. When the anchor is not in use, it is desirable to wind or knot the free end of the line on the bail so as to prevent it from becoming partly unwound therefrom.

Figure 2:
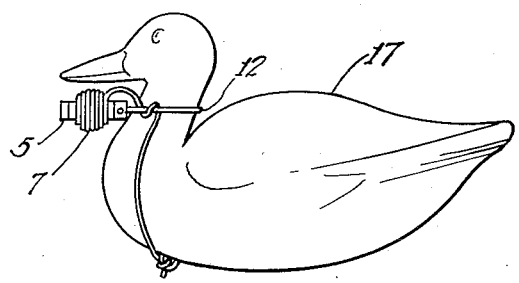
Fig. 2 is a side elevation of the decoy with the anchor attached thereto.
Figure 3:
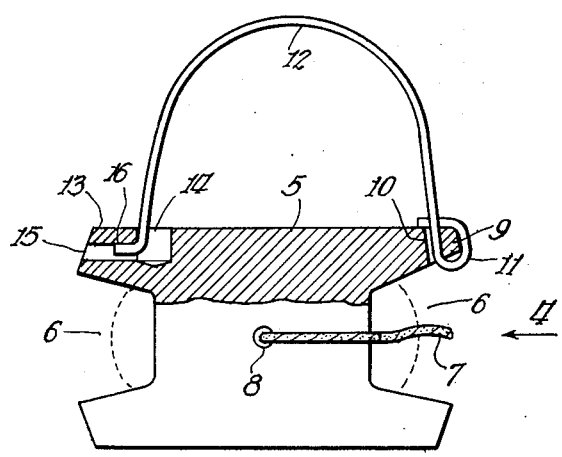
Fig. 3 is a side elevation of the anchor partly broken out.
Figure 4:
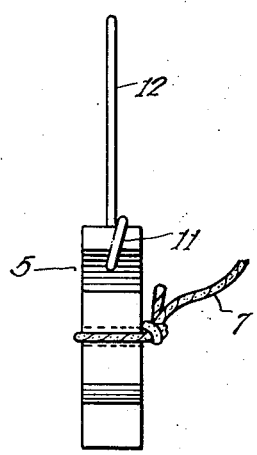
Fig. 4 is an end elevation thereof looking in the direction of the arrow 4 in Fig. 3.
Figure 5:
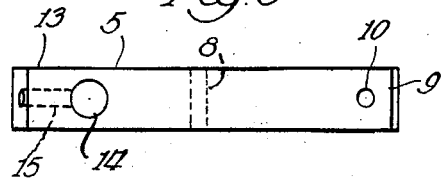
Fig. 5 is a plan thereof with a certain bail seen in Figs. 3 and 4 removed therefrom.

Decoys, one of which is seen at 17, used in hunting ducks or geese are usually in the form of painted bodies simulating a duck or goose and composed of buoyant material, such as wood to enable the decoy to float on the water. When not in use the anchor should be attached to the neck of the duck by the bail as seen in Fig. 2; thus the decoy and anchor are kept inseparable when not in use.

When it is desired to use the decoy in hunting ducks or geese, the reel is removed from the decoy's neck and the bail snapped back into place. The free end of the line is attached to the decoy in the usual customary manner and the reel is dropped into the water allowing the line to unwind from the reel. When the reel touches the bottom of the water, the decoy is placed upon the water and allowed to float about.

After use the decoy is recovered, the reel lifted out of the water and the line rewound upon the reel. The bail is unlatched, the line is wrapped about the bail and the bail is placed around the neck of the decoy and snapped in place in the hole 15.

From the above it is apparent that I have provided a decoy anchor which is simple and inexpensive. Furthermore, that by attaching it to the neck of the decoy it is not likely to become lost but always remains connected to the decoy when not in use.

Having thus described my invention, it is obvious that various immaterial modifications may be made in the same without departing from the spirit of my invention; hence, I do not wish to be understood as limiting myself to the exact form, construction, arrangement and combina- tion of parts herein shown and described or uses mentioned.

What I claim as new and desire to secure by Letters Patent is:

A decoy anchor comprising a weighted flat sided reel having U notches extending inward from its ends, a side of said reel having a socket extending inward and disposed adjacent one end of the reel, and there being a hole extending transversely from said socket, a line attached to said reel and adapted to be wound thereon, and a resilient wire bail pivotally connected at one end to one end of the reel and formed at its other end with an angular end adapted to be inserted into said socket and slipped into said hole in the reel whereby to latch the free end of the bail to the reel, said hole extending substantially in the plane of said bail, the latter being adapted for fastening the reel on the neck of a decoy and for retaining the free end of the line.

JOHN L. BUEHL.

REFERENCES CITED

The following references are of record in the file of this patent:

UNITED STATES PATENTS

| Number | Name | Date |
|---|---|---|
| 248,643 | Galloway | Oct. 25, 1881 |
| 336,704 | Delanoy | Feb. 23, 1886 |
| 976,826 | Obele | Nov. 22, 1910 |
| 1,249,536 | Sorensen | Dec. 11, 1917 |
| 1,461,617 | Hill | July 10, 1923 |
| 1,901,050 | Voorhees | Mar. 14, 1933 |
| 2,023,526 | Hoberg | Dec. 10, 1935 |

FOREIGN PATENTS

| Number | Country | Date |
|---|---|---|
| 26,836 | Great Britain | Dec. 8, 1903 |